Figure 1:
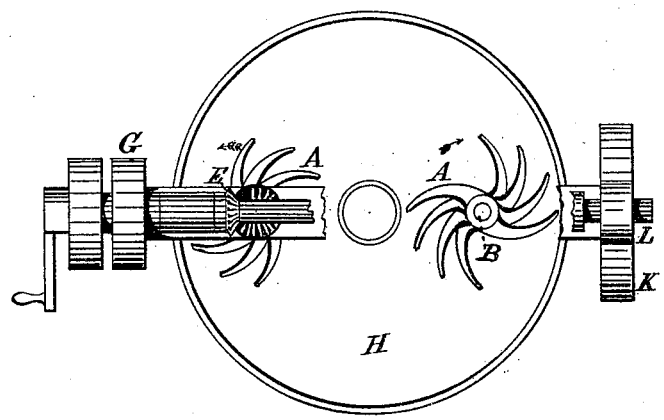

J. E. SMITH.
Sausage-Meat Mixer.

No. 167,031. Patented Aug. 24, 1875.

Witnesses.
Amos W. Sangster.
Wm S. Grosvenor.

Inventor.
John E. Smith.
By James Sangster
Atty.

UNITED STATES PATENT OFFICE.

JOHN E. SMITH, OF BUFFALO, NEW YORK.

IMPROVEMENT IN SAUSAGE-MEAT MIXERS.

Specification forming part of Letters Patent No. 167,031, dated August 24, 1875; application filed July 21, 1875.

*To all whom it may concern:*

Be it known that I, JOHN E. SMITH, of Buffalo, in the county of Erie and State of New York, have invented a new and Improved Sausage-Meat Mixer, which improvement is fully set forth in the following specification, reference being had to the accompanying drawings.

The object of this invention is to thoroughly intermingle or mix the ingredients composing sausage-meat or other equivalent material; and it consists of one or more sets of S-shaped or curved arms rotating upon a vertical axis, and having their lower surfaces inclined in the direction of their movement, in combination with a revolving tub or box for holding the material to be mixed, as will be more clearly understood by reference to the drawing, in which—

Figure 2:
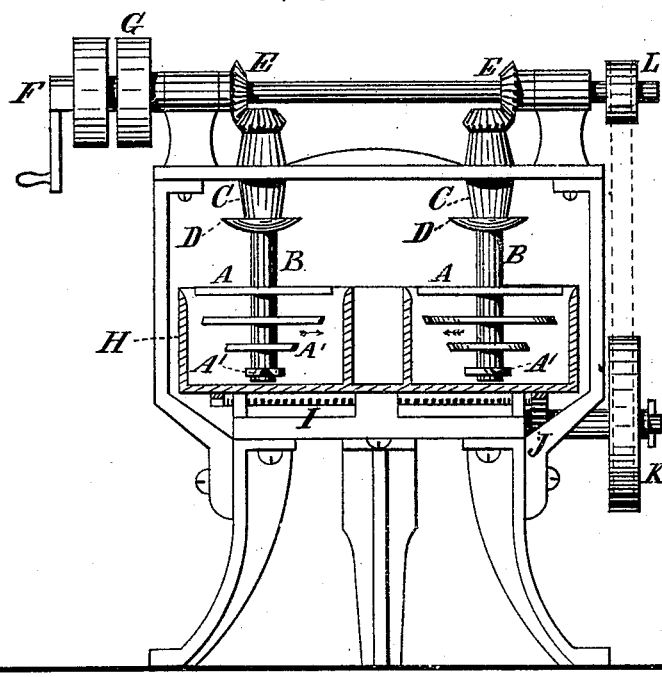

Figure 1 is a plan view, and Fig. 2 a side elevation, of the machine, showing a section through the center of the tub.

A represents the S-shaped mixing-arms. They are connected to the vertical shafts B, which are suspended, as shown, by the journal-box C. D D are oil-cups for receiving the drippings from the lubricator, and E E represent the gearing by which the arms A are operated. F is the driving-shaft, and G the driving-pulley. H is the rotating tub or box for holding the material to be mixed. It is operated by the gearing I J and the belt-pulleys K L. The S-shaped arms A are beveled, as shown at A', Fig. 2, the bevel inclining toward the advancing side of its motion, as shown by the arrows.

In Fig. 1 part of the driving-shaft and upper frame-work is broken away, so as to show the form of the S-shaped arms more clearly, and also the center of the meat box or tub.

I claim as my invention—

1. A meat-mixer consisting of a suitable vessel and a series of arms for mixing sausage-meat, substantially as and for the purposes described.

2. The combination of one or more series of arms with a rotating or movable meat box or tub, substantially as and for the purposes specified.

JOHN E. SMITH.

Witnesses:
JAMES SANGSTER,
WM. S. GROSVENOR.